(12) United States Patent
Skingle

(10) Patent No.: US 9,092,448 B2
(45) Date of Patent: *Jul. 28, 2015

(54) SYSTEM AND METHOD FOR PORTAL INFRASTRUCTURE TRACKING

(71) Applicant: JPMorgan Chase Bank, NA, New York, NY (US)

(72) Inventor: Bruce James Skingle, Hardwick (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 150 days.

This patent is subject to a terminal disclaimer.

(21) Appl. No.: 13/717,050

(22) Filed: Dec. 17, 2012

(65) Prior Publication Data

US 2013/0103661 A1    Apr. 25, 2013

Related U.S. Application Data

(60) Continuation of application No. 11/750,893, filed on May 18, 2007, now Pat. No. 8,335,855, which is a division of application No. 09/956,287, filed on Sep. 19, 2001, now Pat. No. 7,246,263.

(60) Provisional application No. 60/233,871, filed on Sep. 20, 2000.

(51) Int. Cl.
  *G06F 15/173* (2006.01)
  *G06F 9/44* (2006.01)
  *G06F 17/30* (2006.01)
  *H04L 29/06* (2006.01)

(52) U.S. Cl.
  CPC .... *G06F 17/30165* (2013.01); *G06F 17/30938* (2013.01); *H04L 63/20* (2013.01)

(58) Field of Classification Search
  USPC ......................................................... 709/223
  See application file for complete search history.

(56) References Cited

U.S. PATENT DOCUMENTS 5,757,922 A * 5/1998 Shiroshita ........................ 380/42
6,574,675 B1 * 6/2003 Swenson ........................ 719/316

* cited by examiner

*Primary Examiner* — Emmanuel L Moise
*Assistant Examiner* — Mahran Abu Roumi
(74) *Attorney, Agent, or Firm* — Hunton & Williams LLP

(57) ABSTRACT

A method and system for collecting and transmitting data across or through a firewall using HTTP and/or XML between computer systems that do not otherwise grant access to each other. A method and system for preparing data reports using data and report generation modules using HTTP and/or XML between computer systems.

15 Claims, 3 Drawing Sheets

SYSTEM AND METHOD FOR PORTAL INFRASTRUCTURE TRACKING

The present patent application is a continuation application of U.S. patent application Ser. No. 11/750,893 filed May 18, 2007, which is a divisional application of (and claims priority to) U.S. patent application Ser. No. 09/956,287 filed Sep. 19, 2001, both of which claim priority to U.S. Provisional Patent Application 60/233,871 filed Sep. 20, 2000. Accordingly, the present patent application claims priority to such U.S. patent application Ser. No. 11/750,893, U.S. patent application Ser. No. 09/956,287, and U.S. Provisional Patent Application 60/233,871 all of which are incorporated herein by reference in their entirety.

This application claims priority to U.S. Provisional Patent Application Ser. No. 60/233,781, which was filed Sep. 20, 2000, entitled "System And Method For Portal Infrastructure Tracking," the disclosure of which is incorporated herein by reference.

BACKGROUND

1. Field of the Invention

The present invention relates to data transmission between computer systems where the systems are separated by a firewall, and more particularly to the use of hypertext transfer protocol and extensible markup language for the data transmission without a logon across the firewall.

2. Description of the Related Art

As known in the art, it is common for computer systems to install or erect firewall protection to control or restrict access to the system by users or computers that are not part of the system. However, there are circumstances where the system within the firewall (the protected system), needs to allow access by systems or computers that are on the opposite side of the firewall (the outside systems). One way to provide this access through the firewall is to require logon with various forms of authentication or credentials. Once an outside system has been properly authenticated, the outside system can gain access to the authorized data and/or files that are located on the protected system and that would not normally be available to the outside system. This form of logon and authentication does provide a measure of security to the protected system. However, it also requires a user account for the outside system, which may be undesirable for various reasons. For this reason, it is desirable to provide outside systems with access to some of the data on a protected system without providing system access.

As also known in the art, it is common for system administrators to provide regular tracking reports for distributed computer systems. These reports may include statistics on the numbers of users that have accessed a particular web page during a particular period. These types of reports are also generated at different levels of detail or fidelity to correspond to the different interest levels of management that want to review the data. System operators may be interested in much greater detail than senior administrators. However, the data the makes up these different individual reports typically comes from the same resources. Report generation tools exist, and they help with the collection and formatting of data for these types of reports. However, the tools are not particularly flexible in their design, and tend to require multiple resource queries to prepare reports of varying fidelity or detail. Additionally, the programming skills required to use these tools can be high. For this reason, it is desirable to provide tools that provide greater flexibility, while reducing the need to query a resource multiple times. It is also desirable that the tools be reusable, to reduce the need for expensive programming assets.

The preceding description is not to be construed as an admission that any of the description is prior art relative to the instant invention.

SUMMARY OF THE INVENTION

In one embodiment, the invention provides a system and method for data record transmission. The system and method comprises transmitting, from a first location to a second location, a request for unsent data records, the request including information to identify a last received record. The system and method also comprises transmitting, from the second location to the first location, at least one previously unsent data record with associated record identifier. Finally, the system and method comprises updating, at the first location, an identifier of the last received record, wherein a network firewall denying unrestricted access separates the first location and second location.

In another embodiment, the invention provides a system and method for data extraction to support data reporting. The system and method comprises presenting a plurality of data extraction templates, with associated parameters. The system and method also comprises receiving parameters for a particular data extraction template using hypertext transport protocol and extensible markup language. The system and method also comprises extracting data corresponding to the parameters. Finally, the system and method comprises generating a document using the data.

The foregoing specific objects and advantages of the instant invention are illustrative of those which can be achieved by the instant invention and are not intended to be exhaustive or limiting of the possible advantages that can be realized. Thus, the objects and advantages of the instant invention will be apparent from the description herein or as modified in view of any variation that may be apparent to those skilled in the art. Accordingly, the present invention resides in the novel parts, constructions, arrangements, combinations and improvements herein shown and described.

BRIEF DESCRIPTION OF THE DRAWINGS

The features and other aspects of the invention are explained in the following description taken in conjunction with the accompanying drawings wherein.

It is understood that the drawings are for illustration only and are not limiting.

DETAILED DESCRIPTION OF THE DRAWINGS

The various embodiments of the instant invention have many applications, including distributed and networked systems. One particular application is where data sources are located behind network firewalls.

Figure 1:
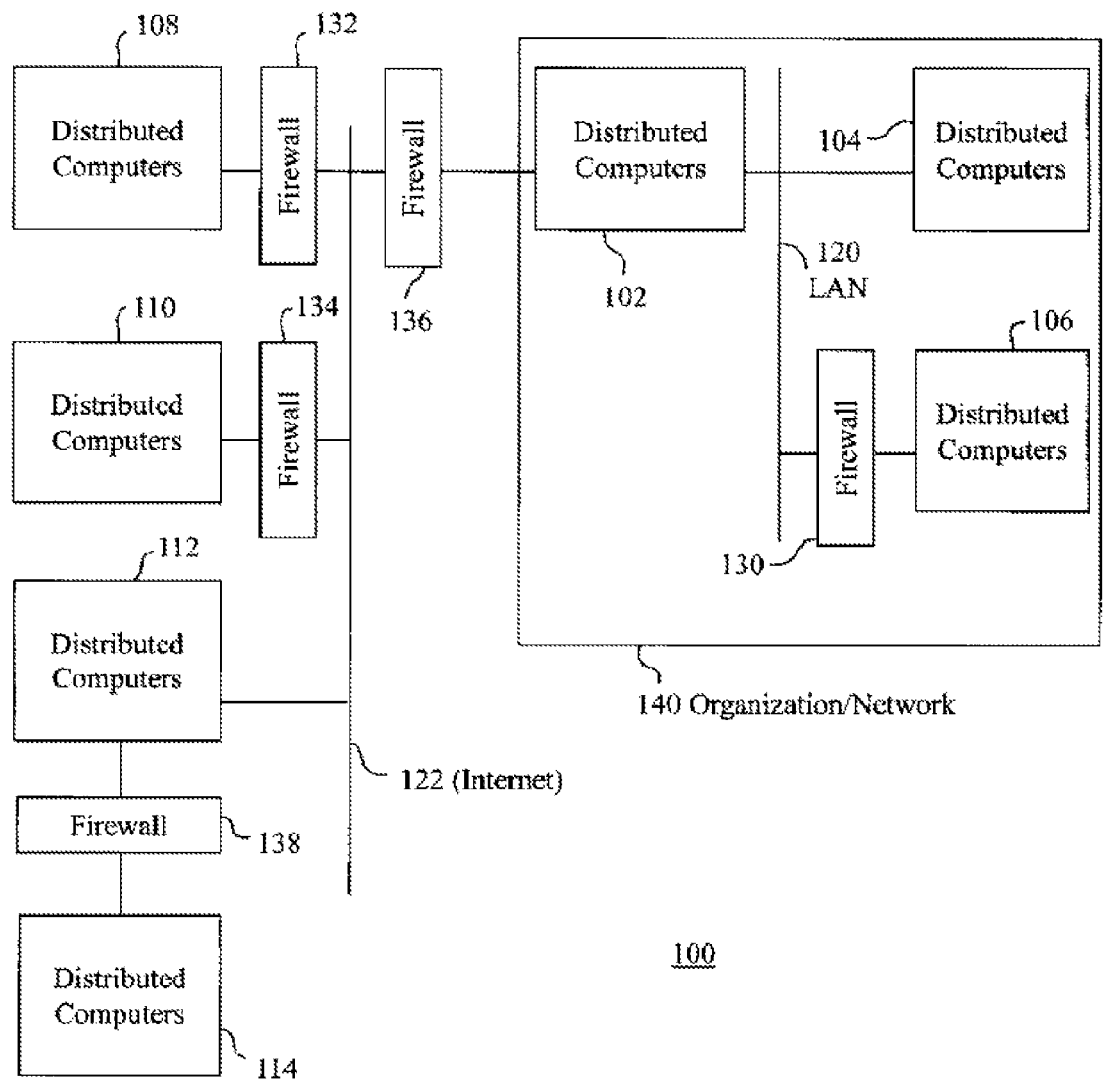
FIG. 1 illustrates one embodiment of a system according to the instant invention.

Referring to FIG. 1, a system 100 according to one embodiment of the invention includes a plurality of distributed computers, (including servers or clients) 102, 104, 106, 108, 110, 112, and 114. The distributed computers are interconnected by local area networks 120, wide area networks, or the Internet 122. Some of the distributed computers have a firewall 130, 132, 134, 136, and 138 to control or restrict access. There are many different types of firewalls, including hardware based, software based and a combination of both hardware and software.

Some of the computers may be part of a particular organization or network 140 that has a firewall 136 to protect the entire network, as well as a firewall 130 to protect individual assets 106.

Although not illustrated, the distributed computers also generally include central processor(s), volatile and nonvolatile memory, input/output devices, displays, removable and fixed storage media and various communication and network interface devices, such as modem, Ethernet, wireless etc.

For the purposes of illustration, computer 102 performs functions of monitor and data collection. In one embodiment, computer 102 is a subscriber. One of the functions of computer 102 is to collect statistics and data from the various other computers (104, 106, 108, 110, 112, 114). In one embodiment other computers 104, 106, 108, 110, 112 and 114 are publishers. Much of the data stored on the other computers is time sensitive and confidential, and the statistics are constantly changing. Therefore computer 102 needs to get data or snapshots of the statistics at particular times. Without the present invention, an operator at computer 102 can log onto each of the other computers and extract the desired data or statistics. However, where the other computer is located behind a firewall, the operator must have access rights to that computer. Providing large numbers of access rights to multiple different computer operators may not be particularly desirable. In one embodiment, the instant invention provides systems and methods for query of the data or statistics residing on other computers without requiring higher level access to the other computers.

An Example of a Portal Infrastructure Tracking Component

The portal infrastructure tracking component running on computer 102 monitors a distributed group of web servers. Data collection, transmission and report generation are specific areas of interest.

Data Collection & Transmission

Referring again to FIG. 1, one problem is to collect data from web servers (104, 106, 108, 110, 112 and 114), which are located in many different places, in an environment where there are multiple firewalls preventing easy access between computers. It is important that computer 102 receives a data record exactly once from any of the web servers. However, there may be limited or no control over the operators of the web servers that are monitored by computer 102. This is particularly important, as some portal content is sourced externally. Normally such a feed would require counters to be maintained on both ends of the link, to ensure that all data is sent exactly once, but the nature of the content providers makes this difficult.

There are several kinds of data for the data feed. The data include event data relating to users accessing assets (documents) on web servers, and the creation and modification of the assets themselves. In one technique, this data on the web servers is ordered.

As indicated, in one embodiment, system 100 has two types of participants, multiple "publishers" and a "subscriber". In this embodiment, all the web servers and content providers (104, 106, 108, 110, 112, and 114) are publishers and the tracking computer 102 is the subscriber.

The publishers produce data with defined ordering characteristics. Assets of the publishers have, or are assigned, a unique numeric ID. For example, more recent assets have higher ID numbers, and no ID number is used more than once by any publisher. In the case of event data, this is gathered from the web server access log files, and each record in the file is treated as a message, with the message physical address in the file being it's ID.

Each publisher implements the publisher end of the interface. However, there is no persistent state associated with each publisher. Additionally, the publishers do not know who is subscribing to the data or where they all are in consuming the data.

The subscriber maintains a record of the ID number of the last message it successfully received. When the subscriber needs to get an update from a particular publisher, the subscriber connects to the particular publisher and passes this ID number to the publisher. The particular publisher receives this ID number and then sends all previously unsent records with a higher ID number than the value received from the subscriber. This is possible when the records are ordered by ID number, and the publisher sends the ID number with the data in each record.

After receiving an update, the subscriber stores the most recent ID number for that particular publisher in a database transaction with the record data. This ensures that the "most recently received ID number" in the subscribers database accurately reflects the data which has been successfully stored as well as received.

In one embodiment, the publisher pushes or continues to send data indefinitely, "sleeping" when there is no more data. As more data becomes available the publisher immediately sends data to the connected subscriber.

In another embodiment, each publisher maintains the data and the subscriber requests or pulls data from the publisher.

If for any reason the subscriber looses some data (say that it restores its database from a backup) then the "most recently received ID number" will be automatically wound back because it too is stored in the database. When the subscriber reconnects with the publisher, this earlier ID number is sent and the publisher re-sends any records after that point. As there is no state on the publishers there is no reconciliation problem, this makes failure modes much simpler than with other publish/subscribe protocols.

In one embodiment, the method is implemented using extensible markup language (XML) with hypertext transport protocol (HTTP). Both are industry standards, and an important characteristic of this combination is that it allows operation over a firewall, without requiring a logon of the accessed computer system. In this manner, computer 102 of system 100 collects data from other computers in an environment that is otherwise somewhat hostile to access using other protocols.

A person of ordinary skill will understand what constitutes XML and HTTP, and therefore a detailed description is not required. However, to assist those who may be less familiar with these two standards, the following summary of XML is extracted from "http://www.w3.org/".

XML provides a method for putting structured data in a text file. "Structured data" includes such things as spreadsheets, address books, configuration parameters, financial transactions, technical drawings, etc. Use of a text format allows a user to look at or use the data without the program that produced it. XML is a set of rules, guidelines, or conventions, for designing text formats for such data, in a way that produces files that are easy to generate and read (by a computer), that are unambiguous, and that avoid common pitfalls, such as lack of extensibility, lack of support for internationalization/localization, and platform-dependency.

XML looks a bit like HTML but is not HTML. Like HTML, XML makes use of tags (words bracketed by '<' and '>') and attributes (of the form name="value"), but while HTML specifies what each tag & attribute means (and often how the text between them will look in a browser), XML uses the tags only to delimit pieces of data, and leaves the interpretation of the data completely to the application that reads it. In other words, if you see "<p>" in an XML file, don't assume it is a paragraph. Depending on the context, it may be a price, a parameter, a person, etc.

XML is text that is not intended to be read by humans. As text files, it intended to be read by a computer, although it allows experts (such as programmers) to more easily debug applications, and in emergencies, they can use a simple text editor to fix a broken XML file. However, the rules for XML files are more strict than for HTML. A forgotten tag, or an attribute without quotes makes the file unusable, while in HTML such practice is often explicitly allowed, or at least tolerated. It is written in the official XML specification: applications are not allowed to try to second-guess the creator of a broken XML file; if the file is broken, an application has to stop right there and issue an error.

XML is a family of technologies. There is XML 1.0, the specification that defines what "tags" and "attributes" are, but around XML 1.0, there is a growing set of optional modules that provide sets of tags & attributes, or guidelines for specific tasks. There is, e.g., Xlink (still in development as of November 1999), which describes a standard way to add hyperlinks to an XML file. XPointer & XFragments (also still being developed) are syntaxes for pointing to parts of an XML document. (An XPointer is a bit like a URL, but instead of pointing to documents on the Web, it points to pieces of data inside an XML file.) CSS, the style sheet language, is applicable to XML as it is to HTML. XSL (autumn 1999) is the advanced language for expressing style sheets. It is based on XSLT, a transformation language that is often useful outside XSL as well, for rearranging, adding or deleting tags & attributes. The DOM is a standard set of function calls for manipulating XML (and HTML) files from a programming language. XML Namespaces is a specification that describes how you can associate a URL with every single tag and attribute in an XML document. What that URL is used for is up to the application that reads the URL, though. (RDF, W3C's standard for metadata, uses it to link every piece of metadata to a file defining the type of that data.) XML Schemas 1 and 2 help developers to precisely define their own XML-based formats. There are several more modules and tools available or under development.

XML is verbose. Since XML is a text format, and it uses tags to delimit the data, XML files are nearly always larger than comparable binary formats. That was a conscious decision by the XML developers. The advantages of a text format are evident and the disadvantages can usually be compensated at a different level. In addition, communication protocols such as modem protocols and HTTP/1.1 (the core protocol of the Web) can compress data on the fly, thus saving bandwidth as effectively as a binary format.

Development of XML started in 1996 and it is a W3C standard since February 1998. Although XML itself is relatively new, the technology itself is not very new. Before XML there was SGML, developed in the early '80s, an ISO standard since 1986, and widely used for large documentation projects. And of course HTML, whose development started in 1990. The designers of XML have taken parts of SGML, guided by the experience with HTML, and produced something that is no less powerful than SGML, but vastly more regular and simpler to use. While SGML is mostly used for technical documentation and much less for other kinds of data, with XML it is exactly the opposite.

HTTP is a communication standard, and the following edited extract of Request for Comment (RFC) 2068 is a summary from "http://www.w3.org/" to assist those with less understanding.

The Hypertext Transfer Protocol (HTTP) is an application-level protocol for distributed, collaborative, hypermedia information systems. HTTP has been in use by the World-Wide Web global information initiative since 1990. The first version of HTTP, referred to as HTTP/0.9, was a simple protocol for raw data transfer across the Internet. HTTP/1.0, as defined by RFC 1945, improved the protocol by allowing messages to be in the format of MIME-like messages, containing metainformation about the data transferred and modifiers on the request/response semantics. However, HTTP/1.0 does not sufficiently take into consideration the effects of hierarchical proxies, caching, the need for persistent connections, and virtual hosts. In addition, the proliferation of incompletely-implemented applications calling themselves "HTTP/1.0" has necessitated a protocol version change in order for two communicating applications to determine each other's true capabilities.

RFC 2068 defines the protocol referred to as "HTTP/1.1". This protocol includes more stringent requirements than HTTP/1.0 in order to ensure reliable implementation of its features. Practical information systems require more functionality than simple retrieval, including search, front-end update, and annotation. HTTP allows an open-ended set of methods that indicate the purpose of a request. It builds on the discipline of reference provided by the Uniform Resource Identifier (URI), as a location (URL) or name (URN), for indicating the resource to which a method is to be applied. Messages are passed in a format similar to that used by Internet mail as defined by the Multipurpose Internet Mail Extensions (MIME).

HTTP is also used as a generic protocol for communication between user agents and proxies/gateways to other Internet systems, including those supported by the SMTP, NNTP, FTP, Gopher, and WAIS protocols. In this way, HTTP allows basic hypermedia access to resources available from diverse applications.

An Example of a Method for Data Collection & Transmission

Figure 2:
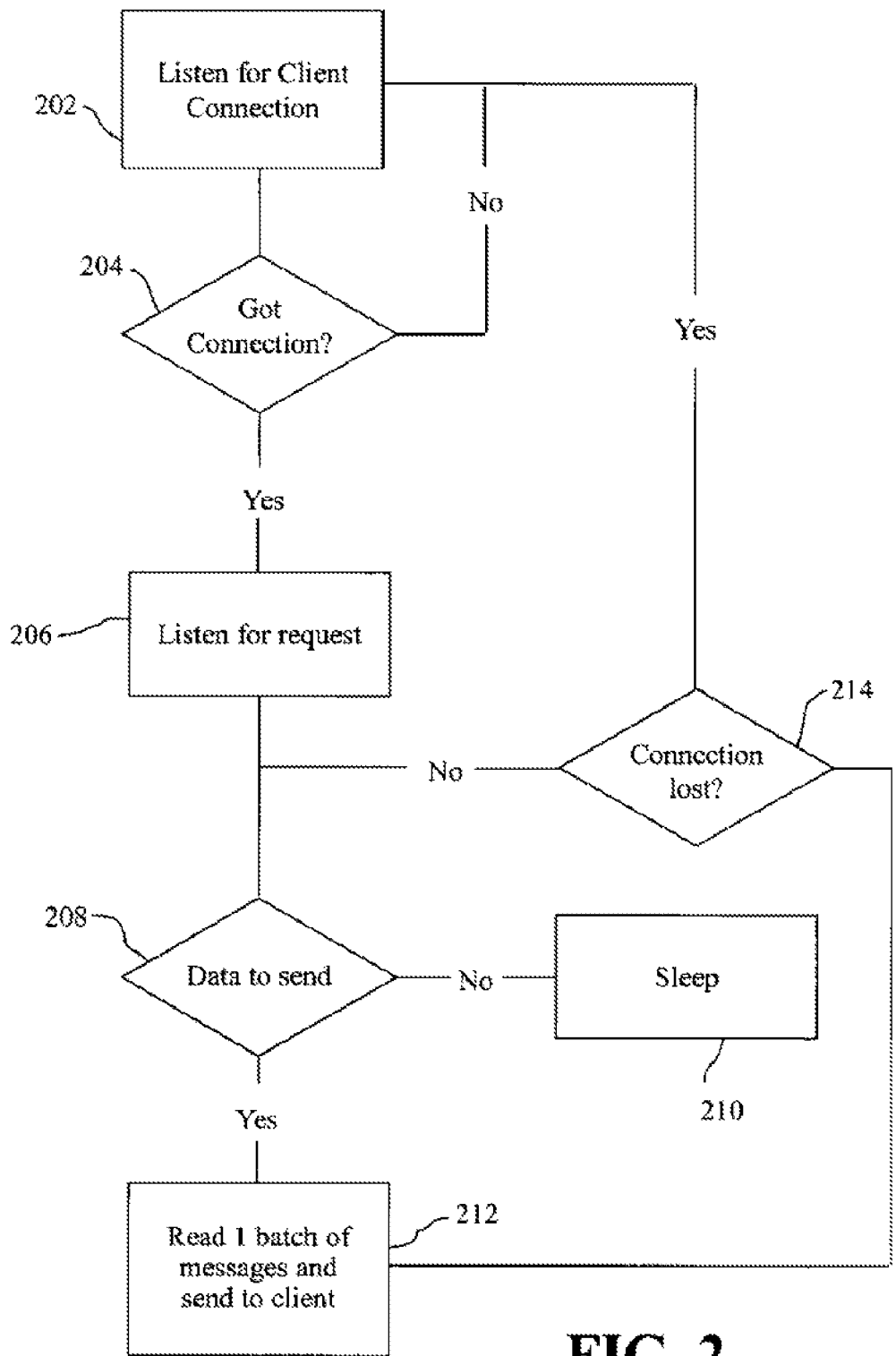
FIG. 2 illustrates one embodiment of a method according to the instant invention.

Referring now to FIG. 2, at step 202, a publisher (104, 106, 108, 110, 112, 114) of system 100 listens on one of the network connections 120, 122 for a connection from subscriber 102.

At step 204, if there is no connection, the publisher continues to listen for a connection.

If there is a connection, then at step 206, the publisher listens for a request from a subscriber. The request will include the last received record identifier that the subscriber holds in their files, and the last received record identifier is maintained by the subscriber. The publisher maintains a similar list of data record identifiers, with associated data records. In this manner, the publisher can compare the subscriber's last received record identifier with the records held by the publisher to determine whether there are any unsent data records.

At step 208, the publisher determines whether there is unsent data to send.

If there is no unsent data to send, then at step 210, the publisher waits or sleeps for some period of time.

If there is unsent data to send, then at step 212, the publisher reads one batch of messages, starting with the oldest unsent batch of messages as indicated by the data identification.

Not illustrated in FIG. 2, the subscriber receives that record and record identifier and updates the last received record identifier.

After sending a message and associated identifier, at step 214, the publisher determines whether the connection between the publisher and subscriber is lost.

If the connection is lost, then at step 202, the publisher listens for a connection from the subscriber.

If the connection is not lost, then at step 208, the publisher determines whether there is unsent data to send.

This process continues until terminated.

Report Generation

Having collected data from various other computers and transmitted the data from the publishers to the subscriber, computer 102 needs to produce reports from it. Using similar techniques the instant invention also includes a distributed reporting tool.

Reporting consists of two quite separate tasks: data extraction, and data presentation. As these are quite different problems, they require different skills to design. However, known reporting tools tend to merge these into one task.

Many of the desired management reports include multiple sections, which are independent of each other in content. Additionally, reports may contain some sections also found in other reports. The combination of these report sections is therefore a presentation (formatting) issue.

One embodiment of the instant invention includes the idea of a "reportlet". A reportlet extracts the data for one report section. The primary task for a reportlet is the data extraction. Presentation itself is not a task of a reportlet. The output of a reportlet is a dialect of XML, which simply describes the structure of the data.

Reportlets operate over HTTP and take their parameters using the standard HTTP parameter passing mechanism. However, the parameters for reportlets are defined in such a way that it is possible to identify parameters taken by two reportlets, which are semantically equivalent.

As an example, consider two reportlets, one shows the "n" most popular documents on a web site, starting from date "D" for a period of "t" days. Another reportlet shows the "n" most active users on that web site, starting from date "D" for a period of "t" days.

A report containing these two reportlets will probably need to report those two statistics for the same period. When constructing a report by choosing a set of reportlets the invention can see where the same value could be passed to all reportlets, thereby simplifying the user experience.

Once the reportlets have been executed and the data gathered, the presentation (formatting) is done using standard tools, such as based on XSLT. This means that the reportlets can be used to produce significantly different results (tables vs graphs for example) simply by applying different XSL style sheets.

In one embodiment of the invention, the reportlets operate over HTTP, and thus they can be located anywhere. This also means that the reportlets need not be connected to a database, and can get data from any source. For example, reportlets can be written which show the current free space available on server file systems and databases. A tracking report engine can then execute these reportlets on all machines in a production cluster and produce a single report showing data for the whole cluster.

Accordingly, in one embodiment, the instant invention provides total absence of server side persistent state relating to client subscriptions, with resulting desirable failure mode characteristics. This includes use of web standards to enable distributed data gathering and reporting.

An Example of Report Generation

Figure 3:
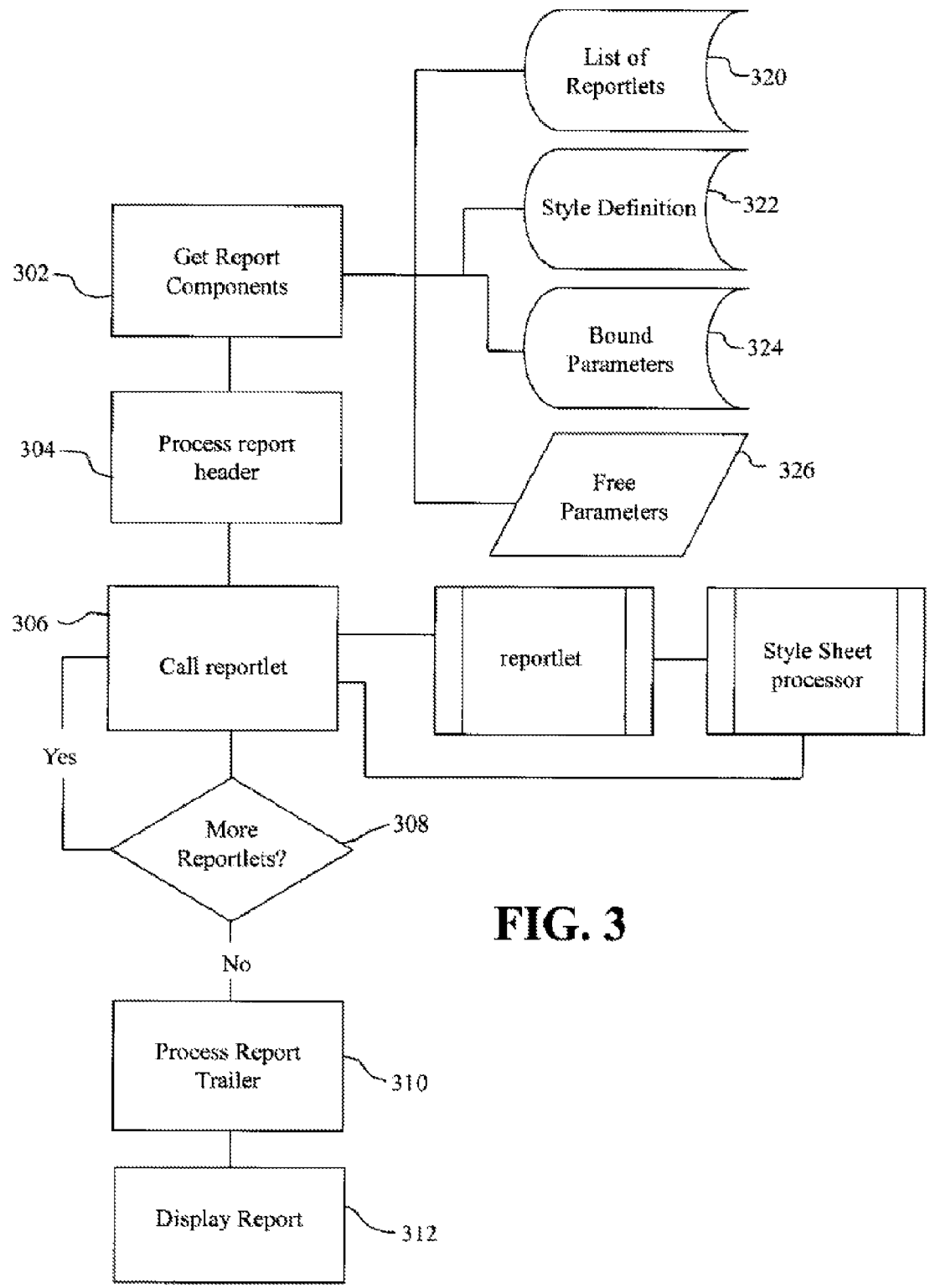
FIG. 3 illustrates one embodiment of a method according to the instant invention.

Referring now to FIGS. 1 and 3, at step 302, computer 102 of system 100 gets report components. These components include elements such as a list of reportlets 320, style definitions 322, bound parameters 324 and free parameters 326. The components (320, 322, 324, 326) may reside on computer 102, or they may reside on other computers (104, 106, 108, 110, 112, 114).

At step 304, computer 102 processes a report header.

At step 306, computer 102 calls one of the reportlets, which includes a reportlet and style sheet processor.

At step 308, computer 102 determines whether there are additional reportlets. If there are additional reportlets, then at step 306, computer 102 calls another one of the a reportlets.

If there are no additional reportlets, then at step 310, computer 102 processes the report trailer, and at step 312 displays the report. a Having provided a detailed description of the system and method of the invention, further examples are provided below.

An Example Server "Querygram": Any SQML server can contain QueryGram contexts, if required in addition to normal SQML contexts. In this example the server is a publisher.

To add a QueryGram context we construct the context and add items to it as before. All we need to do in addition is call the SQMLContext.setQueryGram( ). This method takes the following parameters:

| Type | name | Description |
| --- | --- | --- |
| SQMLItem | item | The item which represents the key for the QueryGram. This must be a numeric datatype |
| int | batchSize | The server sends a set rowcount as part of the query to satisfy QueryGram requests, this is to stop a request returning excessively large numbers of rows. This parameter sets the value for this. The request will actually be repeated until all data has been sent, so this value simply limits the size of any one select against the database. |
| int | sleepTime | When the server queries the database and finds no new data to send it goes to sleep before re-executing the query to see if more data has arrived. This parameter defines the length of the sleep in milliseconds. In the example we are sleeping for 30 seconds. |
| int | minSleep | As a means of limiting the load on the server you can specify a minimum sleep time. If this paramater is positive then the server will sleep for the given number of milliseconds after each select on the database even if there is more data to return. In the example we are sleeping for 10 seconds, which would probably be excessive in a real application. |

Note that a QueryGram context may also be accessed as a regular SQML context if required.

```
context = new SQMLContext("event", "Events
QueryGram",
        "TRKEVENT");
    item = new SQMLItem("id", "Primary Key",
        "TRKEVENT.id", true,
SQMLItem.NUMERIC);
    context.setQueryGram(item, 20, 30000, 10000);
    context.addItem(item);
    context.addItem(new SQMLItem("eventTime",
  "Time of the event",
        "TRKEVENT.eventTime", false,
```

-continued

```
SQMLItem.STRING));
    context.addItem(new SQMLItem("assetId", "The
asset accessed",
        "TRKEVENT.assetId", false,
SQMLItem.NUMERIC));
    context.addItem(new SQMLItem("refererAssetId",
"The referring asset",
        "TRKEVENT.refererAssetId", false,
SQMLItem.NUMERIC));
    context.addItem(new SQMLItem("principalId", "User
ID",
        "TRKEVENT.principalId", false,
SQMLItem.STRING));
    addContext(context);
```

This completes the implementation, the SQMLServlet class provides all the necessary functionality to service queries as they arrive.

An Example Client "Querygram": The implementation of a QueryGram client is very similar to a normal SQML client. In this example the client is a subscriber.

QueryGram requests are identified with a context name, and you can specify which fields you require using the wanted( )method as before.

The only difference in the request is that the queryGram( )method must be called, passing the integer ID of the most recently received QueryGram. All QueryGrams with a higher id than this will then be returned in ID sequence.

Note that you will get the QueryGram id with each row returned irrespective of whether you request it. This ID must be persisted so that you can restart the feed from the correct point next time. Conditions are ignored by QueryGram requests because they are keyed on the QueryGram ID by definition.

Data is then returned in the same way as with a normal SQML request, the only difference being that there will never be any end to the data returned. When all available data has been sent the server will wait for more to become available and this will be returned as additional rows at that time.

Note that the server may throttle (place limits on) the returned data stream.

Tracking QueryGram Example: The Tracking service provides a QueryGram interface to provide notifications of events. As with the normal SQML example we need to sub class SQMLQueryProxy:

```
class QueryGramProxy extends SQMLQueryProxy
{
    public QueryGramProxy(URL url, String requestId, String
contextName)
    {
        super(url, requestId, contextName);
    }
    public void processResultRow(SQMLResultRow row)
    {
        String items[ ];
        int     i;
        System.out.println("Query ID =<" + row.qid( ) +
">");
        items = row.items( );
        for(i=0 ; i<items.length ; i++)
        {
            System.out.println(items[i] + " = <" +
row.get(items[i]) + ">");
        }
        System.out.println("--------");
        System.out.flush( );
    }
}
```

Inside the run( )method we construct the query proxy as before, specifying the wanted items, but instead of setting a condition we call the queryGram( )method passing in a QueryGram id. The process( )method is then called, as before:

```
public void run( )
{
    QueryGramProxy query;
    int         id = 132704; // queryGram id we last
received
    try
    {
        System.out.println("event where id>" + id);
        query = new QueryGramProxy(
            new URL(
"http://jpmpsdev1.ny.jpmorgan.com/servlet/TrackingSQMLServle
t"),
            "eventRequest",
            "event");
        query.queryGram(id);
        query.wanted("id");           // NB you get id
anyway
        query.wanted("eventTime");
        query.wanted("principalId");
        query.wanted("assetId");
        query.process( );
    }
    catch(Exception e)
    {
        System.err.println("An error has ocurred: " +
e.toString( ));
    }
}
```

A Total System: The Example Server and Example Client above describe the essential aspects of one embodiment of the invention. The example of a total system, which is provided below, illustrates other embodiments of the invention in a larger system context.

Tracking: The Tracking & Reporting component of the Portal Infrastructure implements a number of SQML interfaces. The examples below describe the various interfaces and their use, but before describing the interfaces in detail we will describe the tracking application particularly with respect to its needs from content providers.

The tracking system monitors activity on web based portals. There are 2 parts to the process with respect to any given content provider. Firstly there is the tracking of events, or user activity on the site. Secondly, there is a need to find out what asset any particular URL refers to and to map those assets on to Tracking's unified asset model.

Content Providers, Portals and Users: Tracking is a multiple system tracking and reporting service. This means that activity is tracked across multiple systems and activity for a single user on several systems can be reported on together.

Tracking also understands the idea of a portal, as an intermediary between the user and the content provider which acts as an aggregator. Tracking is currently linked to the CRD user account system, and so only systems which use CRD for account maintenance can be easily tracked.

When recording events, it is possible to describe the user, the asset (document, page or whatever) and the portal. This means that it is possible to report in a variety of ways including: 1) All activity for a given user; 2) Activity for all content providers through a given portal; and 3) Activity for a given content provider through all portals.

The Asset Model: It is important to understand that each content provider maintains, identifies and classifies its assets in its own way. The object of the Tracking & Reporting system, however, is to provide an integrated reporting environment where user activity may be tracked across portals and content providers. It is therefore necessary to name assets and classifications in a globally unique way. This is done by prefixing some system specific name with the domain name of the content provider, so a Morgan Markets asset might be called www.morganmarkets.com/asset/12345 and a JPM Portal asset could be portal.jpmorgan.com/asset/567.

The only requirement on these Globally Unique Identifiers is that they are unique, however there is a convention that assets are called domain/asset/id, classifications are domain/class/id and classification types are domain/classtype/id. An asset may be assigned one or more classifications, which help to describe the asset. Examples of classifications might be United Kingdom, US Dollars or North America.

Reports can be produced based upon asset classifications, so one might produce a report detailing all assets associated with North America.

Classifications are hierarchical, so US Dollars might be a child of United States so a query for all assets associated with United States would include all assets classified as US Dollars.

Classifications all have exactly one classification type. Examples of classification types are Country, Currency and Country Group.

Interfaces: Tracking has 2 collection interfaces, the first collects data about events in the systems monitored. The second is the asset lookup interface, which tracking uses to find out about assets for which events have been received.

There are two implementations of the event data interface. The first is a web server log file reader, which processes the standard log file produced by a web server. The second is an API which an application can call to record trackable events.

The Problem with Webserver Logfile Processing:

Most web server tracking solutions work by processing the event logs of the web servers. This is a fundamentally difficult approach for a number of reasons: 1) The web log is written by the web server as a general debugging aid and is not specifically aimed at tracking business events; 2) There is a large quantity of uninteresting or irrelevant data in the logs; 3) While there is some standardization of log file formats there is variation in the files produced by different systems and extra processing is required to resolve URLs recorded in the log file to asset Identifiers; 4) URLs on their own do not always uniquely identify what the user saw, for example a URL might mean "display the latest edition of Global Data Watch." It is not possible to determine which document was displayed without further processing; and 5) Log files contain the GET parameters for URLs accessed by default. They do not contain POST parameters or cookies unless special action is taken to log that data. In any event there may be additional context within an application which makes it impossible to see from the logfile data what actually happened.

An API approach is preferable because the application knows when a business event has taken place and can usually identify the exact asset which is being accessed.

Interface Design Principles: The first design rule of tracking interfaces is that tracking is not a mission critical application. This means that if for any reason there is a system failure which makes tracking user activity impossible that this should not interfere with the underlying application. No user should be refused any service on the grounds that the delivery of that service cannot be tracked.

The second design rule is that content systems should not be required to maintain any state relating to tracking interfaces.

The event capture API works by creating a file on the content providers local system. This file is then read by a remote log reader in the same way as web server log files.

Event Capture: The job of the event interface is to collect raw event data as quickly as possible, it should not be doing any complex processing. That said, there is a large volume of uninteresting data in web server logs, and the log reader discards irrelevant data wherever it can.

As we have already said, the Event API works by writing a log file on the content system's local disk. This file is then read by a special version of the log reader which is also used to process web server logs.

The log reader works as a CGI application, running on a web server on the system being monitored. The reader is given the name of the log file to read and the point to which it has already processed the file by the Tracking server. It then processes the file and sends back one record per asset access.

For each event the log reader sends back the following information:

| | |
|---|---|
| fileName | The name of the log file currently being read |
| inode | The inode number of the log file currently being read |
| seekAddr | The seek address within the file of the current line |
| lineNum | The line number within the file of the current line |
| eventTime | The time of the event being recorded |
| url | The MUURL of the asset accessed |
| principalId | The ID of the principal (user) who accessed the asset |
| sessionId | The unique ID of the user session (if known) |
| portalId | The unique ID of the portal which generated this access (if known) |
| refererUrl | The MUURL of the asset which lead the user to this asset (if known) |
| resultCode | The HTTP result code of the event |
| nBytes | The number of bytes transferred in servicing this request (if known) |
| serviceTime | The number of milliseconds taken to service this request (if known) |
| userAgent | The HTTP_USER_AGENT string for the users browser |
| remoteAddr | The IP address from which the request came |
| eventType | The type of the event, currently always 1, (asset displayed) |

The assets are identified by a modified form of URL called a MUURL. This is like a URL except that the protocol element (http://, htttps:// etc.) is stripped off and any unnecessary parameters may also be stripped off. An MUURL therefore looks like a domain name, followed by a slash and some string which can be used to identify assets within that domain.

A single URL does not always map onto a single asset, and each asset does not always have a single URL. Assets are identified by a globally unique identifier (GUID). When processing web server logs it is sometimes impossible to uniquely identify the asset from the given URL without some complex processing (for example looking up attributes in a database).

When using the event logging API the application is required to provide the GUID for the asset being accessed. When processing a webserver log file, if it is possible to deduce the asset's GUID then this is indicated by prefixing the GUID with a slash character and providing it as the MUURL. If this is not possible then the asset lookup interface is called by tracking later with the MLTURL and the time of the event, it must then return a GUID from these two pieces of data, using whatever asset databases it requires.

Event API: The Event API works by writing a special log file on a local disk of the content system servers. A log reader then reads this data and sends it back to the tracking server. The Event API interface is defined in terms of the format of the file, tracking then also provides a set of bindings to facilitate the creation of this file.

Event Log File Format: The event API log file consists of newline terminated records each containing tab separated fields. Each record (line) records one event. The fields for each record are as follows:

| Name | Example | Description |
| --- | --- | --- |
| eventTime | 980512690453 | The time of the event being recorded as a decimal number encoded as an ascii string. The number is a unix time_t value (number of seconds since Jan. 1st 1970). |
| assetId | /www.morganmarkets.com/asset/1234 | The GUID of the asset accessed prefixed with a single slash |
| principalId | bskingle | The (CRD) ID of the principal (user) who accessed the asset |
| sessionId | 56327536217 | The unique ID of the user session (if known) |
| portalId | Morgan Markets | The unique ID of the portal which generated this access (if known) |
| refererUrl | /portal.jpmorgan.com/asset/7890 | The GUID of the asset which led the user to this asset, prefixed with a slash (if known) |
| resultCode | 200 | The HTTP result code of the event, if in doubt pass 200 (OK) |
| nBytes | 4242 | The number of bytes transferred in servicing this request (if known) |
| serviceTime | 220 | The number of milliseconds taken to service this request (if known) |
| userAgent | Mozilla/4.0 (compatible; MSIE 5.01; Windows NT) | The HTTP_USER_AGENT string for the users browser |
| remoteAddr | 198.75.91.68 | The IP address from which the request came |
| eventType | 1 | The type of the event, currently always 1, (asset displayed) |

The tracking provided API bindings ensure that the generated file is correctly named and written sequentially. If an application generates the file directly it must ensure that if several processes write to the file that the data is written correctly. In particular it is essential that if two processes write to the file simultaneously that the data is not interleaved and that only whole records (lines) are written.

Event Log File Naming and Handling: The event log file must have a name which contains no dot characters. This name must be suffixed with a dot and the date in the form YYYYMMDD. The application should periodically (normally daily) create a new log file with a new date suffix. The old files must remain in place for at least 48 hours, after which they may be archived or deleted.

The log file reader will automatically detect the creation of a new file and begin reading it, after which the old file will not normally be re-read. It is therefore important that only one file be appended to at any one time. If it is necessary to create multiple files simultaneously then these must be named differently and each must be suffixed with the current date.

If it is necessary to roll logs more than once per day then additional sequence numbers may be added to the end of the date suffix, but it is essential that the files are created in alphabetical sequence of their suffixes.

Java API: The Java Event API is part of the tracking public API (package com.jpmorgan.portalinfra.tracking) and is distributed as part of tracking jar. The API has a threaded model which attempts to ensure that the application calling the API is not blocked on any internal activity such as writing the log file. The application thread calling the API simply places the logged data on an in memory queue, a separate thread is responsible for actually writing out the data.

The log file name give is automatically suffixed with the current date, users of the Java API need not worry about rolling the log file, although archiving and deleting old files is the responsibility of the calling application.

Using the API in an Application: There are 2 classes which are of interest when logging events from applications. TrackingEventManager is the class which handles the actual writing of the log file. It is a singleton, and has a getINstance( )method. It also has a setLogFileName(String name) method which enables you to set the name of the log file. This should be a full path name ending with a name containing no dot characters. The current date will be appended to the given name automatically.

In this code fragment we get the EventManager and set the log file name:

```
TrackingEventManager tem =
TrackingEventManager.getInstance( );
tem.setLogFileName(System.getProperty("PORTALINFRA_ROOT_
DIR") + "eventLogs/testLog");
```

In order to log an event we must create a LoggableTrackingEvent object. This has various setter methods which can be called to set the attributes of the event:

```
LoggableTrackingEvent myTrackingEvent = new
LoggableTrackingEvent( );
myTrackingEvent.setEventTime(System.currentTimeMillis( ));
myTrackingEvent.setAssetId(assetID);
myTrackingEvent.setUserId(userID);
myTrackingEvent.setUserAgent(browserId);
myTrackingEvent.setEventType(TrackingEvent.DISPLAY);
```

Finally we must call the Events log( ) method to log the event:

```
try
{
    myTrackingEvent.log( );
}
catch(TrackingEventException e)
{
    System.out.println(e.toString( ));
}
```

Using the API in a Servlet: The same technique could be used when logging events from a servlet. However as a convenience the tracking library provides the LoggableTrackingServletEvent class which can initialize itself from a HTTPServletRequest:

```
TrackingEventManager tem =
TrackingEventManager.getInstance( );
//Define log file
String logFileName =
System.getProperty("PORTALINFRA_ROOT_DIR")
    + "/" +
    getLogFileDirectory( ) +
    "ReportServletLog";
tem.setLogFileName(logFileName);
LoggableTrackingServletEvent myTrackingEvent = new
LoggableTrackingServletEvent(req);
myTrackingEvent.setEventTime(System.currentTimeMillis( ));
myTrackingEvent.setAssetId(getReportIdPrefix( ) +
    reportRunId.toString( ));
String userId = req.getHeader("User");
if (userId == null)
{
    userId = req.getHeader("REMOTE_USER");
    if (userId == null)
    {
        userId = req.getHeader("HTTP_USER");
        if (userId == null)
        {
            userId = "Unknown";
        }
    }
}
myTrackingEvent.setUserId(userId);
myTrackingEvent.setEventType(TrackingEvent.DISPLAY);
try
{
    myTrackingEvent.log( );
}
catch(TrackingEventException e)
{
    System.out.println(e.toString( ));
}
```

Example Log Reader: The log reader interface is implemented as a C++ application. There are a number of classes which implement the basic log reader functionality and one class which is responsible for parsing the log file. This class must be modified for each system to be monitored.

We will illustrate the implementation of a log reader with the Morgan Markets log file reader. The abstract base class TtrkGenericLogParser implements the bulk of the parser, this must be sub-classed and the method processLine must be defined. Aside from the constructor and destructor (which may be empty) this is all that needs to be implemented.

We begin by including the necessary headers and defining a few constants and the constructor/destructor:

```
#include <string.h>
#include <iostream.h>
#include <strstream.h>
#include <stdlib.h>
#include "TtrkMorganMarketsLogParser.hpp"
#include "THttpURL.hpp"
const char *myDomain = "www.morganmarkets.com";
#define URLMAXLEN       1024
TtrkMorganMarketsLogParser::TtrkMorganMarketsLogParser( )
{
}
TtrkMorganMarketsLogParser::~TtrkMorganMarketsLogParser( )
{
}
```

The GID for any assets begins with the domain name of the provider, for Morgan Markets this is www.morganmarkets.com, and the constant myDomain is defined for this.

Next we declare the processLine method. This is passed the line to be parsed, together with the file name, Mode number, seek address and line number of the data, which must be passed back to the tracking server if an event is to be recorded from this log file entry.

Various variables are declared, which are used later, eventType is always "display" at present, but a tracking constant for this is defined in TtrkGenericLogParser. The processLine method should return false on end of file or other fatal processing error, otherwise it should return true.

```
bool TtrkMorganMarketsLogParser::processLine(char *line,
        const char *fileName,
        ino_t inode, daddr_t seekAddr,
        int lineNum)
{
    char        *token[128];
    char        urlBuf[URLMAXLEN];
    char        areaBuf[URLMAXLEN];
    int         id;
    int         tokenCnt;
    int         i;
    char        *asset;
    char        *urlPath;
    char        *urlFile;
    char        *urlExtension;
    const char  *p;
    time_t      eventTime = -1;
    char        *url = 0;
    const char      *principalId = "";
    const char      *sessionId = "";
    const char      *beanId = "";       //OBSOLETE Pass NULL
    const char      *pageId = "";       //OBSOLETE Pass NULL
    const char      *portalId = "";
    const char      *refererUrl = "";
    int         resultCode = -1;
    int         nBytes = -1;
    int         serviceTime = -1;
    char        *userAgent = "";
    char        *remoteAddr = "";
    TtrkEventType eventType =
TtrkGenericLogParser::DISPLAY;
    const char      *target;
```

In order to record an event, processLine( ) must call the logAccess( ) method defined in TtrkGenericLogParser. If for any reason the parser wished to discard the current line, it simply returns without calling this method.

The parser first checks to see if the line is the format header which the web server usually writes as the first line in the file. If so then this is discarded. Next it calls tokeniseLine( ) which breaks up a line on white space, respecting quotes and fills in an array of char pointers to point to each word in the line. The return value is the number of words detected.

A check is performed to ensure that the expected number of fields have been found, if there are not enough then the error( ) method is called to pass an error message to the tracking server, the line is then discarded.

```
if(strncmp(line, "format=", 7)==0)
    return(true);
tokenCnt = tokenizeLine(line, token, 128);
if(tokenCnt<7)
{
    strstream    msg;
    msg << "Failed to parse line <" << line
<< "> got " <<
        tokenCnt << " tokens (<7)" << endl
<< ends;
        error(msg.str( ));
        return(true);
}
```

Morgan Markets fills in the principal (user) ID in the REMOTE_USER field (the third field in the log file). Lines without any user id data are of little use, and in the case of Morgan Markets represent accesses to the portal before login has been completed. These entries (which have a single hyphen in the file) are ignored.

```
principalId = token[2];
// Ignore lines without principal data, these are pre-login
// screens
if(principalId[0]=='-' && principalId[1]=='\0')
    return(true);
```

Some of the required fields are then extracted based on known positions in the log file. The method parseStdWebLogDate( ) parses a standard web log file date (of the form [21/May/2000:00:01:56-0400]) and returns a time_t value.

```
resultCode = atoi(token[5]);
eventTime = parseStdWebLogDate(token[3]);
asset = token[4];
nBytes = atoi(token[6]);
remoteAddr = token[0];
userAgent = token[7];
```

The asset details identified above is actually a quoted field with three words, the HTTP methof (GET or POST), the URL, and the HTTP protocol ID. We now use tokeniseLine( ) again to extract just the URL from this field, again an error is reported if insufficient words are parsed.

```
tokenCnt = tokenizeLine(asset, token, 128);
if(tokenCnt<3)
{
    strstream    msg;
    msg << "Failed to parse asset data <" <<
asset << "> got " <<
        tokenCnt << " tokens (<3)" << endl
<< ends;
        error(msg.str( ));
        return(false);
}
THttpURL    httpUrl(token[1]);
```

The THttpURL class is defined in the tracking interface library, and represents a URL. It provides a number of methods to access the various fields of a URL including any GET parameters. The methods uriFile( ) and uriPath( ) return the last element of the URL file path and all but the last element of the file path respectively.

Within Morgan Markets the last file name element before the file name represents the research area.

```
bool        stripParams=false;
const char      *file = httpUrl.uriFile( );
const char      *researchArea;
const char      *rp = httpUrl.uriPath( );
if(file==0 || rp==0)
    return(true);
while(*rp!='\0')
{
    if(*rp=='/' && rp[1]!='\0')
        researchArea = rp + 1;
    rp++;
}
```

Having established the research area and file name, a number of possibilities can be checked to see if the line should be discarded

```
if(strcmp(file, "emailViewPub.html") == 0)
    return(true);
if ((target = httpUrl.getParamByName("target")) &&
    (strncmp(target, "http", 4) == 0))
    return(true);
```

The httpUrl.getParamByName(name) method returns the value of a single HTTP get parameter included in a URL. The values of market and REGION can be used to augment the research area name.

```
if(p=httpUrl.getParamByName("market"))
{
    snprintf(areaBuf, URLMAXLEN, "%s%s/",
researchArea, p);
        researchArea = areaBuf;
}
if(p=httpUrl.getParamByName("REGION"))
{
    snprintf(areaBuf, URLMAXLEN, "%s%s/",
researchArea, p);
        researchArea = areaBuf;
}
```

Within Morgan Markets, a URL with a get parameter called z is used to access an asset by its Morgan Markets unique identifier. When the URL is of this form we can immediately generate the GID for the asset, which saves a call to the Asset Lookup interface later.

A complete resolution of the GD is indicated by returning a MUURL which begins with a slash character. In this case, the value of the z parameter is a number and the GID for this asset is www.morganmarkets.com/asset/nnnn where nnnn is the value of the z parameter.

```
if(p=httpUrl.getParamByName("z"))
{
    // we expect the value of z to be a number
    id = atoi(p);
    if(id==0)
        return(true);
    // otherwise we can create the full resolved ID right
away
    // note use of leading slash to indicate fully resolved
global id
```

```
            snprintf(urlBuf, URLMAXLEN, "/%s/asset/%d",
        myDomain, id);
            url = urlBuf;
        }
```

A number of special cases are now checked, where URLs do not map onto assets in the database:

```
        else if(strcmp(file, "index.html") ==0)
        {
            snprintf(urlBuf, URLMAXLEN, "/%s/area/%s%s",
        myDomain, researchArea,
                              file);
            url = urlBuf;
        }
        else if(strstr(file, "search") && httpUrl.uriExtension( )!=0)
        {
            if(strcmp(httpUrl.urlExtension( ), "gif")!=0)
            {
                snprintf(urlBuf, URLMAXLEN,
        "%s/area/%ssearch", myDomain,
                              researchArea);
                url = urlBuf;
            }
            else
                return(true);
        }
        else if(strncmp(file, "cdDoc", 5) ==0)
        { snprintf(urlBuf, URLMAXLEN,
        "/%s/area/creditDerivatives", myDomain);
            url = urlBuf;
        }
        else if((strncmp(file, "emailManageSub", 14) ==0) ||
              (strncmp(file, "emailSignupPage", 15) ==0))
        {
            snprintf(urlBuf, URLMAXLEN, "/%s/area/subscription",
        myDomain);
            url = urlBuf;
        }
        else if(httpUrl.getParamByName("target") ||
              httpUrl.getParamByName("attr"))
        {
            stripParams=false;
        }
        else
            return(true);
```

Next we check for a number of special portal attributes which may have been added to the URL as GET parameters if this access came via the JPM portal. The following attributes may be defined:

| Long Name | Short Name | Description |
| --- | --- | --- |
| JPMPSReferer | JPMPSR | URL of the referring asset |
| JPMPSUserId | JPMPSU | The Principal (user) ID |
| JPMPSPortalId | JPMPSP | ID of the portal which generated the access |

If the refererUrl is defined then a THttpURL object is created and its toLoggerString method is used to convert it to the MUURL format. We pass the value of myDomain so that the correct domain can be added if this is a relative URL.

```
        refererUrl =
    httpUrl.getParamByNameAndRemove("JPMPSReferer");
        if(refererUrl==0)
            refererUrl =
    httpUrl.getParamByNameAndRemove("JPMPSR");
        if(refererUrl==0)
        {
            refererUrl = "";
        }
        else
        {
            THttpURL newUrl(refererUrl);
            refererUrl = newUrl.toLoggerString(myDomain);
        }
```

The other portal values are then checked, note that we must check both the long and short names.

```
        target =
    httpUrl.getParamByNameAndRemove("JPMPSUserId");
        if(target==0)
            target =
    httpUrl.getParamByNameAndRemove("JPMPSU");
        if(target!=0)
            principalId = target;
        beanId = "";
        pageId = "";
        portalId =
    httpUrl.getParamByNameAndRemove("JPMPSPortalId");
        if(portalId==0)
            portalId =
    httpUrl.getParamByNameAndRemove("JPMPSP");
        if(portalId==0)
            portalId = "";
        sessionId =
    httpUrl.getParamByNameAndRemove("JPMPSSessionId");
        if(sessionId==0)
            sessionid =
    httpUrl.getParamByNameAndRemove("JPMPSS");
        if(sessionId==0)
            sessionId = "";
```

If the variable stripParams has been set to true then all of the GET parameters on the URL can be discarded. The httpUrl.removeAllParams( ) method ensures that when the url is constructed by the toLoggerString method that these are not included.

```
        if(stripParams)
            httpUrl.removeAllParams( );
        // if url has been set then use that value
        if(url==0)
            url = httpUrl.toLoggerString(myDomain);
```

Finally, we call logAccess( ) to send back the access details to the tracking server.

```
        logAccess(fileName, inode, seekAddr, lineNum,
            eventTime, url, principalId, sessionId,
            beanId, pageId, portalId,
            refererUrl,
            resultCode, nBytes, serviceTime, userAgent,
            remoteAddr, eventType);
        return(true);
    }
```

A trivial main( ) is also required to instantiate an instance of the concrete parser class and the log reader main class:

```
#include "TtrkWebLogReader.hpp"
#include "TtrkGenericLogParser.hpp"
#include "TtrkMorganMarketsLogParser.hpp"
int main(int argc, char *arg[])
{
  TtrkMorganMarketsLogParser  *parser;
  TtrkWebLogReader            *reader;
  parser = new TtrkMorganMarketsLogParser( );
  reader = new TtrkWebLogReader(parser);
  return(reader->mainLoop(argc, argv));
  delete reader;
  delete parser;
}
```

TtrkGenericLogParser: TtrkGenericLogParser is the abstract super class for log parser implementations. It defines a number of utility methods for use by concrete implementations. These utility methods are declared as follows:

```
void  error(const char *message);
void  info(const char *message);
void  warning(const char *message);
void  logAccess(
  const char          *fileName,
  ino_t               inode,
  daddr_t             seekAddr,
  int                 lineNum,
  time_t              eventTime,
  const char          *url,
  const char          *principalId,
  const char          *sessionId,
  const char          *beanId,
  const char          *pageId,
  const char          *portalId,
  const char          *refererUrl,
  int                 resultCode,
  int                 nBytes,
  int                 serviceTime,
  const char          *userAgent,
  const char          *remoteAddr,
  TtrkEventType       eventType);
time_t parseStdWebLogDate(const char *date);
int    tokenizeLine(char *line, char *tokens[], int cnt);
```

Utility Methods:

error(message)—Returns the given message as a fatal error message to the tracking server.

warning(message)—Returns the given message as a non-fatal warning message to the tracking server.

info(message)—Returns the given message as an informational message to the tracking server.

parseStdWebLogDate(date)—Takes a standard web server log file format date string and returns the time_t representation of it. The date is expected to be of the form [21/May/2000:00:01:56-0400] where the last number represents an offset from GMT.

tokenizeLine(line, tokens, cnt)—Breaks up a line into tokens. Tokens are separated by white space and may be quoted with double quote characters. All token separators and quotes are removed, the array tokens is filled in with addresses of the first cnt tokens. The number of tokens detected is returned.

logAccess( . . . )—Sends an event message to the tracking server, the following parameters are required:

| Name | Description |
| --- | --- |
| filename | The name of the log file currently being read, (passed to the processLine method by the log reader) |
| inode | The inode number of the log file currently being read, (passed to the processLine method by the log reader) |
| seekAddr | The seek address within the file of the current line, (passed to the processLine method by the log reader) |
| lineNum | The line number within the file of the current line, (passed to the processLine method by the log reader) |
| eventTime | The time of the event being recorded, as a time_t |
| url | The MUURL of the asset accessed |
| principalId | The ID of the principal (user) who accessed the asset |
| sessionId | The unique ID of the user session (if known) |
| beanId | The unique ID of the portal bean which generated this access (if known) |
| pageId | The unique ID of the portal page which generated this access (if known) |
| portalId | The unique ID of the portal which generated this access (if known) |
| refererUrl | The MUURL of the asset which lead the user to this asset (if known) |
| resultCode | The HTTP result code of the event |
| nBytes | The number of bytes transferred in servicing this request (if known) |
| serviceTime | The number of milliseconds taken to service this request (if known) |
| userAgent | The HTTP_USER_AGENT string for the users browser |
| remoteAddr | The IP address from which the request came |
| eventType | The type of the event, currently always 1, (asset displayed) |

ThttpURL: ThttpURL represents a URL and defines a number of public methods as follows:

```
THttpURL(const char *urlString);
~THttpURL( );
const char  *getParamByName(const char *name);
const char  *getParamByNameAndRemove(const char *name);
const char  *getParamAt(int idx);
const char  *getNameAt(int idx);
int         getParamCnt( );
char   *toString( );
char   *toLoggerString( );
char   *toLoggerString(const char *host);
const char  *protocol( )   { return(protocol_);   }
const char  *host( )       { return(host_);       }
const char  *port( )       { return(port_);       }
const char  *uriPath( )    { return(uriPath_);    }
const char  *uriFile( )    { return(uriFile_);    }
const char  *uriExtension( ) { return(uriExtension_); }
void   removeAllParams( );
```

Methods:

THttpURL(urlString)—The constructor takes the string representation of a URL and initializes the class. An example URL is http://example.jpmorgan.com/docs/examples/first.html?mode=header&title=First toLoggerString(host)—This method constructs the string representation of the given URL as a MUURL suitable for passing to the tracking server. A MUURL has no protocol element, and should have all extraneous elements removed. The example URL above would be represented as example.jpmorgan.com/docs/examples/first.html?mode=header&title=First. The optional domain parameter will be used to fill in the domain for a relative URL. Some or all of the parameters may be removed from the MUURL representation.

removeAllParams( )—Marks all parameters to be excluded from the MUURL form when toLoggerString is subsequently called.

getParamByName(name)—Returns the value of the given parameter, or NULL if not present. Using the example above getPramByName("mode") would return the string "header".

getParamByNameAndRemove(name)—Returns the value of the given parameter and marks it to be excluded from the MUURL form when toLoggerString is subsequently called.

getParamAt(idx)—Returns the value of the parameter at index position idx.

getNameAt(idx)—Returns the name of the parameter at index position idx.

getParamCnt( )—Returns the number of parameters present.

toString( )—Returns the whole URL in its string representation.

protocol( )—Returns the protocol element of the URL. In the example above this would be the value http:// host( )—Returns the host element of the URL. In the example above this would be the value example.jpmorgan.com port( )—Returns the port element of the URL. In the example above this would be the value NULL. Note that this method does not substitute known port assignments by the value of the protocol.

uriPath( )—Returns the path element of the URL. In the example above this would be the value/docs/examples uriFile( )—Returns the file name element of the URL. In the example above this would be the value first.html uriExtension( )—Returns the file name extension element of the URL. In the example above this would be the value html Asset Lookup: The Asset Lookup interface provides a way for the tracking system to find out about assets from the system being monitored. This is implemented as an SQML server.

A single URL does not always map onto a single asset, and each asset does not always have a single URL. The first step in processing an event is to uniquely identify the assets involved. It is sometimes possible for the log reader to deduce the globally unique identifier (GUID) for an asset just from the information in the log file, and if this is possible it does so. If this is not possible then the asset lookup interface is called with the MUURL and the time of the event, it must return a GUID from these two pieces of data, using whatever asset databases it requires.

Once a GUID has been obtained for an event the tracking system looks to see if it already knows about this asset. If it does not then another call is made to the asset lookup interface to get the necessary details for the asset.

The details required are:

| Name | A short name or description for the asset |
| --- | --- |
| Description | A longer description for the asset |
| Classifications | Zero or more classification IDs which apply to this asset |

The asset lookup interface also provides interfaces for the tracking system to discover the details (name, description and type) for a classification and the name and description of a classification type. The asset lookup interface is implemented as an SQML server. This server must implement the following SQML query contexts:

| Name | Keys | Return Values | Description |
| --- | --- | --- | --- |
| assetId | url, accessTime | guid | Identify assets from URLs |
| assetDetail | guid | name, description | Detail assets from GID |
| assetClassification | guid | class | Get asset classifications |
| classDetail | guid | name, description, typeId | Detail about Classifications |
| classRelations | guid | parent, child | Detail about Classifications parents and children |
| classTypeDetail | guid | name, description, typeId | Detail about Classification Types |
| classTypeRelations | guid | parent, child | Detail about Classification Types parents and children |
| asset | id | guid, name, description | New Asset QueryGram |

The asset context is a QueryGram, which may be used to actively tell tracking about new assets as they are published. The other contexts are used by tracking to discover details of assets it has seen events for from the Log Reader interface.

The tracking server will only call these interfaces for assets which it has no record of. If the content provider system updates assets then the QueryGram interface must be used to notify tracking when an update occurs, otherwise updates will not be detected by tracking.

For each of the required contexts there is an abstract super class provided in the Tracking library which implements helper methods. The following table lists the classes defined for the Morgan Markets asset lookup, and the appropriate super class. The table links to the source code for the examples and the API documentation for the super classes:

| Example Class | Super Class |
| --- | --- |
| MorganMarketsAssetClassificationQuery | AssetClassificationSQMLQuery |
| MorganMarketsAssetDetailQuery | AssetDetailSQMLQuery |
| MorganMarketsAssetIdQuery | IdentifyAssetSQMLQuery |

Example Asset Lookup: The Morgan Markets asset lookup interface is an example of the complex form of an SQML server. The Morgan Markets asset database is a Sybase data server, however some of the URLs used to access assets do not map directly on to database tables. The asset QueryGram is implemented as a simple SQML QueryGram, with a database table as the data source. All of the other contexts require some special processing. Additionally the actual access to the database is exclusively through Sybase stored procedures.

The class MorganMarketsSQMLServlet contains the main SQMLServlet declaration which defines the required query contexts. This class uses the Portal Iffrastructure Database class to encapsulate database access, and requires a "pool name" to get the DB connection details from a properties file.

Several of the classes we will describe shortly need the database connection pool name. The constructor follows the usual pattern for an SQML servlet, passing in the pool name and a logger to the SQMLServlet constructor.

```
public class MorganMarketsSQMLServlet extends SQMLServlet
{
    private XQMLLogger          theLog_;
    final static private String poolName_ =
"morganMarkets";
    public MorganMarketsSQMLServlet( )
    {
        super(poolName _);
        theLog_ = new
XQMLLogger("MorganMarketsSQMLServlet");
    }
```

As with all SQMLServlets, there is no actual body in this implementation, just a definition of the init method, the super class is then left to handle requests as usual.

The init method begins by declaring some variables and calling the usual SQML super class initialization methods.

```
public void init(ServletConfig conf) throws ServletException
{
    SQMLContext                         context;
    SQMLItem                            item;
    MorganMarketsAssetIdContext
assetIdContext;
    MorganMarketsAssetDetailContext
assetDetailContext;
    MorganMarketsAssetClassificationContext
assetClassificationContext;
    theLog_.log("MorganMarketsSQMLServlet.init( )");
    super.init(conf);
    initSQMLServlet(theLog_);
```

Now begins the task of actually declaring the various contexts, first the assetId context, which is implemented as a custom class.

```
assetIdContext = new
MorganMarketsAssetIdContext("assetId",
    "Identify assets from URLs", theLog_,
poolName_);
```

Next we declare the url item, which is a mandatory key, and may not be selected as a result item (i.e., if url is supplied as the value of a wanted element of an SQML querey then an error will result). This is indicated by the field SQMLBaseItem.MANDATORY|SQMLBaseItem. FILTERONLY. We also need to restrict the comparisons which may be made in the query to equality tests, this is because the query will be answered by a stored procedure which takes fixed parameters. This is indicated by the field SQMLExpression.EQ.

```
assetIdContext.addItem(new SQMLBaseItem("url",
    "URL used to access asset",
SQMLBaseItem.MANDATORY|SQMLBaseItem.FILTERONLY,
    SQMLExpression.EQ,
SQMLBaseItem.STRING));
```

We then go on to declare the accessTime item, which is an optional key, and the guid (Globally Unique Identifier) which is the only result item. Finally we add this context to the servlet.

```
assetIdContext.addItem(new
SQMLBaseItem("accessTime",
    "Time of access",
SQMLBaseItem.OPTIONAL|SQMLBaseItem.FILTERONLY,
    SQMLExpression.ANY,
SQMLBaseItem.STRING));
    assetIdContext.addItem(new SQMLBaseItem("guid",
    "Globally Unique Identifier",
    SQMLBaseItem.NO, SQMLExpression.ANY,
    SQMLBaseItem.STRING));
addContext(assetIdContext);
```

The classRelations context is implemented as a standard SQMLContext which uses a stored procedure to answer actual queries. We use the getSQMLContext method, which is provided by SQMLServlet to create this context and pass the usual parameters.

Because this context is using a stored procedure the tableList parameter is passed the name of the stored procedure (portalGetClassRelations in this example), the joinClause parameter is null and an additional Boolean parameter with the value true indicates that the interface is via a stored procedure.

```
context = getSQMLContext("classRelations",
    "Detail about Classifications parents and
children",
    "portalGetClassRelations", null, true);
```

The stored procedure takes a single class ID produces a result set containing att_keyname and att_keyname_parent. It is defined as follows:

```
CREATE PROC portalGetClassRelations
(
    @classId char(30)
)
AS
BEGIN
    set rowcount 0
    SELECT att_keyname, att_keyname_parent
    FROM attribute_relationship
    WHERE att_keyname = @classId
    OR att_keyname_parent = @classId
END
```

The class SQMLPrefixItem is used to define the items for this query because the values passed to and returned by the query have a fixed prefix by comparison to the values used by the stored procedure. For example the GUID www.morganmarkets.com/class/100000789 is identified in the database as a row with a value of 100000789. SQMLPrefixItem takes an additional parameter which is the prefix which should be stripped from selection criteria values and added to results.

```
context.addItem(new SQMLPrefixItem("guid",
"Guid",
    "classId",
SQMLBaseItem.MANDATORY|SQMLBaseItem.FILTERONLY,
    SQMLExpression.EQ, SQMLItem.STRING,
    "www.morganmarkets.com/class/"));
    context.addItem(new SQMLPrefixItem("parent",
"Parent Guid",
    "att_keyname_parent",
    SQMLBaseItem.NO, SQMLExpression.ANY,
```

-continued

```
        SQMLItem.STRING,
            "www.morganmarkets.com/class/"));
        context.addItem(new SQMLPrefixItem("child", "Child
Guid",
            "att_keyname",
            SQMLBaseItem.NO, SQMLExpression.ANY,
SQMLItem.STRING,
            "www.morganmarkets.com/class/"));
        addContext(context);
```

The code then goes on to declare the other contexts in a similar way, except for the QueryGram context, which is slightly different. This query is also answered by a stored procedure, note that the id key must be specified as a greater than condition by the field SQMLExpression.GT.

The statement context.setQueryGram(item, 20, 30000, 50); makes this a QueryGram context. The parameters mean that at most 20 rows will be returned on each call, the server will sleep for 30 seconds (30000 milliseconds) when there is no more data, and will sleep for at least 50 milliseconds after each batch.

```
        context = getSQMLContext("asset",           "Info
about Assets",
            "portalGetNewAsset", null, true);
        item = new SQMLItem("id",              "Primary
Key",
            "id_asset", SQMLBaseItem.MANDATORY,
            SQMLExpression.GT,
SQMLItem.NUMERIC);
        context.setQueryGram(item, 20, 30000, 50);
        context.addItem(item);
        context.addItem(new SQMLPrefixItem("guid",
"Globally Unique ID",
            "id_asset",
            SQMLBaseItem.NO, SQMLExpression.ANY,
SQMLItem.NUMERIC,
            "www.morganmarkets.com/asset/"));
        context.addItem(new SQMLItem("name",      "Short
descriptive name",
            "filename",
            SQMLBaseItem.NO, SQMLExpression.ANY,
SQMLItem.STRING));
        context.addItem(new SQMLItem("description",
"Long descriptive name",
            "name",
            SQMLBaseItem.NO, SQMLExpression.ANY,
SQMLItem.STRING));
        addContext(context);
```

A Custom Context: The assetId context is implemented as a custom context because some URL's require database lookups and some do not. Furthermore depending on the URL the actual DB query varies. This could probably have been implemented as a single Sybase Stored Procedure but this is unnatural and would be inefficient.

The class MorganMarketsAssetIdContext defines the custom context, which is actually a trivial class returning instances of The class MorganMarketsAssetIdQuery, which implements the actual lookup logic.

The purpose of a query context object is to hold any parameters required by the context (such as a database connection pool name) and to act as a factory class for query objects to answer queries as they arrive. The SQML server is a sub class of HttpServlet, and is multi threaded. It is therefore important that the context class ensures that each query object is thread safe. In this example this means ensuring that each query object has its own database connection.

The getQuery method therefore constructs a new Database object for each query, the same log object is shared as this is a synchronized class.

```
public class MorganMarketsAssetIdContext extends
SQMLBaseContext
{
    String poolName_;
    public MorganMarketsAssetIdContext(String name, String
description,
            XQMLLogger log, String poolName)
    {
        super(name, description, log);
        poolName_ = poolName;
    }
    public XQMLQuery getQuery(String requestId)
    {
        return(new MorganMarketsAssetIdQuery(this,
requestId, log_,
            new Database(poolName_)));
    }
}
```

Now we come to the query class, which does the actual work. This is a subclass of IdentifyAssetSQMLQuery which is a Tracking class. This is an abstract class, the method processAssetIdQuery must be defined by subclasses. IdentifyAssetSQMLQuery handles the SQML query interface, and sets up the following protected member variables before calling IdentifyAssetSQMLQuery:

| Type | Name | Description |
| --- | --- | --- |
| String | myDomain_ | The lookups domain name, www.morganmarkets.com in this example. Set in constructor |
| String | url_ | The value of the url element in the query |
| SQMLBaseContext | sqmlContext_ | A reference to the query context |
| Hashtable | params_ | A hash table of all GET parameters on the URL (see getParam( ) below) |
| String | host_ | The host part of the URL |
| String | uri_ | The URL less the host |
| String | accessTime_ | The value of the accessTime element of the query |

A helper method protected String getParam(String name) is also provided which returns the value for a given parameter name, or NULL if not present.

The query class begins by defining the constructor, which is quite straight forward. Note that the domain name for Morgan Markets is hard coded here, as this class is specific to that system.

```
public class MorganMarketsAssetIdQuery extends
IdentifyAssetSQMLQuery
{
    Database        database_;
    public
MorganMarketsAssetIdQuery(MorganMarketsAssetIdContext
context,
        String requestId, XQMLLogger log, Database
database)
    {
        super(context, requestId, log);
        myDomain_ = "www.morganmarkets.com";
        database_ = database;
    }
}
```

The real work takes place in the processAssetIdQuery method, which begins by checking for the trivial case that the MUURL given is a fully resolved asset ID, of the form/asset/ xxxxx. This is necessary because a reference to a Morgan Markets URL might appear in the log file from another system. This URL might be in the fully resolved format but the log reader for that system cannot know that, and neither does tracking, so such URLs will be passed to the Morgan Markets asset lookup interface for resolution.

The local variable assetId is used to indicate the result of the query.

```
        protected boolean
    processAssetIdQuery(StringBuffer output)
            throws Exception
        {
            String      assetId = null;
            int         i,j;
            String      file;
            String      area;
            if(url__.startsWith("/asset/"))
            {
                assetId = url__;
            }
```

The next step is to identify the file name and research area, which are the last two elements of the filename part of a Morgan Markets URL. We do not try to explain or justify the structure of Morgan Markets URLs here, but these two elements are used to identify assets.

```
        else
        {
            String val;
            String name=null, target=null;
            String z;
            i = uri__.lastIndexOf('/');
            j = uri__.lastIndexOf('/', i-1);
            if(i>=0)
            {
                file = uri__.substring(i+1);
                if(j>=0)
                    area = uri__.substring(j+1,i);
                else
                    area = "";
            }
            else
            {
                file = "";
                area = "";
            }
```

The next section finds the value of a parameter called z or Z, URLs which contain this parameter are references to assets in the Morgan Markets database and the value of z is the primary key on the asset table.

The parameters market and REGION augment the research area.

```
            z = getParam("z");
            if(z==null)
                z = getParam("Z");
            val = getParam("market");
            if(val!=null)
                area = area + "/" + val;
            val = getParam("REGION");
            if(val!=null)
                area = area + "/" + val;
```

A number of trivial cases are then checked, where the ID can be deduced directly from the URL contents for either assets identified by a z number or pseudo assets, index pages etc.

```
            if(z!=null)
            {
                assetId = "/asset/" + z;
            }
            else if(file.startsWith("index"))
            {
                assetId = "/area/" + area + "/index";
            }
            else if(file.startsWith("search"))
            {
                assetId = "/area/" + area + "/search";
            }
            else if(file.startsWith("cdDoc"))
            {
                assetId = "/area/creditDerivatives";
            }
            else if(((val = getParam("target"))!=null &&
                    val.equals("Subscription")) ||
                    file.startsWith("emailManageSub") ||
                    file.startsWith("emailSignupPage"))
            {
                assetId = "/area/" + area + "/subscription";
            }
```

Finally the more complex cases where a database lookup are required are handled. The actual DB lookup is done in one of two further methods, described below.

```
            else if((val = getParam("attr"))!=null)
            {
                assetId = getAssetByAttr(val,accessTime__);
            }
            else if(((name = getParam("name"))!=null) ||
                    ((target = getParam("target"))!=null))
            {
                if(name == null)
                {
                    if(target!=null)
                        assetId = "/area/" + target + "/" +
        file;
                }
                else
                {
                    i = name.indexOf('|');
                    if(i>0)
                        name = name.substring(0,i);
                    assetId = getAssetByTarget(name,
        accessTime__);
                }
                if((assetId==null) && (target!=null))
                    assetId = "/area/" + target + "/" + file;
            }
        }
```

At this point the asset ID has either been resolved or there is a fatal error. The method returns true if any output was generated, as is standard for any SQML query class. The method sqmlApplicationError(String message) can be used to return an error message to the tracking server.

```
        if(assetId==null)
        {
            sqmlApplicationError("Unknown Asset",
                "Cannot determine asset id for \"" + url__ +
"\"");
            return(false);
        }
        else
        {
            output.append(sqmlRowStart( ));
            output.append(sqmlItem("guid", myDomain__ +
assetId));
```

-continued

```
            output.append(sqmlRowEnd( ));
            return(true);
        }
    }
```

The queries requiring DB lookups are handled by further methods. getAssetByAttr finds assets based upon attributes and an access time. The database_member is a Portal Infrastructure Database object which wraps a JDBC connection and handles deadlock retries. The style of use is the same as for a raw JDBC connection.

The stored procedure portalGetAssetByAttr executes the necessary database query.

```
    private String getAssetByAttr(String attr, String
accessTime)
    {
        boolean results;
        int rowCnt;
        String retval=null;
        try
        {
            database_.sqlCmd("EXEC portalGetAssetByAttr \"" +
                attr + "\", \"" +
                accessTime + "\"\n");
            results = database_.sqlCmdExecOnly( );
            do
            {
                if (results)
                {
                    ResultSet rs =
database_.sqlCmdGetResultSet( );
                    for(rowCnt = 1; rs.next( ); rowCnt++)
                    {
                        retval = "/asset/" + rs.getString(1).trim( );
                    }
                }
                else
                {
                    rowCnt =
database_.sqlCmdGetUpdateCount( );
                }
                results = database_.sqlCmdGetMoreResults( );
            } while (results || rowCnt!= -1);
        }
        catch(Exception ex)
        {
            sqmlError(SQMLError.InternalServerError, "SQL
Exception: " +
                ex.toString( ));
        }
        return(retval);
    }
```

Although illustrative embodiments have been described herein in detail, it should be noted and will be appreciated by those skilled in the art that numerous variations may be made within the scope of this invention without departing from the principle of this invention and without sacrificing its chief advantages.

Unless otherwise specifically stated, the terms and expressions have been used herein as terms of description and not terms of limitation. There is no intention to use the terms or expressions to exclude any equivalents of features shown and described or portions thereof and this invention should be defined in accordance with the claims that follow.

What is claimed is:

1. A method for data record transmission, the method performed by a computer processor operably connected to a memory portion, the method comprising:

inputting, by the computer processor at a second location, a request for data records from a first location, the request including a last record identifier of a last previously received data record;

determining by the computer processor, at the second location, further data records that have become available subsequent to the computer processor, at the second location, sending the last previously received data record to the first location, the further data records not having been available for sending at the time of sending of the last previously received data record, and the determining, by the computer processor, being based on the last record identifier being compared with further record identifiers associated with the further data records;

transmitting by the computer processor, from the second location to the first location, the further data records, the further data records being associated with a respective one of the further record identifiers, each of the last record identifier and the further record identifiers being a unique identification that is assigned to a respective one, and only one, data record such that the last record identifier and the further record identifiers are all different from each other; and the transmitting, by the computer processor, including transmitting the further record identifier of a last received further data record so as to provide for updating, at the first location, the further record identifier of the last received further data record.

2. The method of claim 1, the unique identification constituted by a numeric identification.

3. The method of claim 1, each of the last record identifier and the further record identifiers being a unique identification that is assigned by the computer processor disposed at the second location.

4. The method of claim 1, further comprising maintaining by the computer processor, at the second location, the further record identifier of the last received further data record.

5. The method of claim 1, wherein inputting, by the computer processor at the second location, the request for data records from the first location uses hypertext transport protocol.

6. The method of claim 1, wherein inputting, by the computer processor at the second location, the request for data records from the first location uses extensible markup language.

7. The method of claim 1, wherein transmitting by the computer processor, from the second location to the first location, uses hypertext transport protocol.

8. The method of claim 1, wherein transmitting by the computer processor, from the second location to the first location, uses extensible markup language.

9. The method of claim 1, wherein the last record identifier, of the last previously received data record, is an integer identifier.

10. The method of claim 1, the determining, at the second location, further data records that have become available subsequent to the computer processor, at the second location, sending the last previously received data record to the first location, includes:

determining, by the computer processor, a plurality of data records that have a sequence number that is higher than the record identifier of the last previously received data record.

11. The method of claim 1, the determining, at the second location, further data records that have become available subsequent to the computer processor, at the second location, sending the last previously received data record to the first location, includes:

determining, by the computer processor, a plurality of data records that have a sequence number with a value that extends beyond the record identifier of the last previously received data record.

12. The method of claim 1, the data records each constituting an asset of the second location, which is transmitted to the first location.

13. The method of claim 1, the data records each constituting a document at the second location, which is transmitted to the first location.

14. The method of claim 1, each of the further record identifiers not being date or time based.

15. A processing device that performs data record transmission, the processing device constituted by a computer processor operably connected to a memory device, the processing device comprising:

code to input, by the computer processor at a second location, a request for data records from a first location, the request including a last record identifier of a last previously received data record;

code to determine by the computer processor, at the second location, further data records that have become available subsequent to the computer processor, at the second location, sending the last previously received data record to the first location, the further data records not having been available for sending at the time of sending of the last previously received data record, and the determining, by the computer processor, being based on the last record identifier being compared with further record identifiers associated with the further data records;

code to transmit by the computer processor, from the second location to the first location, the further data records, the further data records being associated with a respective one of the further record identifiers, each of the last record identifier and the further record identifiers being a unique identification that is assigned to a respective one, and only one, data record such that the last record identifier and the further record identifiers are all different from each other; and the transmitting, by the computer processor, including transmitting the further record identifier of a last received further data record so as to provide for updating, at the first location, the further record identifier of the last received further data record.

* * * * *